(12) United States Patent
Tani et al.

(10) Patent No.: US 6,315,354 B1
(45) Date of Patent: Nov. 13, 2001

(54) AUTOMOTIVE AIR DUCT AND GARNISH STRUCTURE

(75) Inventors: Toshihiko Tani; Yasuyuki Koma, both of Saitama (JP)

(73) Assignee: Honda Giken Kogyo Kabushiki Kaisha

(*) Notice: Subject to any disclaimer, the term of this patent is extended or adjusted under 35 U.S.C. 154(b) by 0 days.

(21) Appl. No.: 09/721,655

(22) Filed: Nov. 27, 2000

(30) Foreign Application Priority Data

Nov. 26, 1999 (JP) .................................................. 11-335417

(51) Int. Cl.[7] ...................................................... B60J 7/000
(52) U.S. Cl. ............................. 296/208; 296/214; 454/137
(58) Field of Search ................................... 296/208, 214; 454/137

(56) References Cited

U.S. PATENT DOCUMENTS

| 4,432,213 | * | 2/1984 | Katahira et al. | 62/239 |
| 4,640,184 | * | 2/1987 | Matsushima et al. | 98/2.15 |
| 4,783,115 | * | 11/1988 | Galubensky et al. | 296/208 |
| 5,399,121 | * | 3/1995 | Gray et al. | 454/137 |
| 5,441,326 | * | 8/1995 | Mikalonis | 296/208 |
| 5,632,673 | * | 5/1997 | Derees | 296/208 |
| 6,062,635 | * | 5/2000 | Learman et al. | 296/208 |
| 6,068,046 | * | 5/2000 | Pommier et al. | 296/208 |
| 6,086,145 | * | 7/2000 | Wandyez | 296/214 |
| 6,120,090 | * | 9/2000 | Van Ert et al. | 296/214 |
| 6,120,370 | * | 9/2000 | Asou et al. | 454/137 |
| 6,123,377 | * | 9/2000 | Leecher et al. | 296/208 |
| 6,123,616 | * | 9/2000 | Otsuka | 296/208 |
| 6,152,522 | * | 11/2000 | Boulay et al. | 296/208 |
| 6,158,796 | * | 12/2000 | Weber | 296/208 |

FOREIGN PATENT DOCUMENTS

| 58-156463 | * | 6/1983 | (JP) . |
| 1-141164 | * | 6/1989 | (JP) . |

* cited by examiner

Primary Examiner—Joseph D. Pape
Assistant Examiner—Kiran B. Patel
(74) Attorney, Agent, or Firm—Arent Fox Kintner Plotkin & Kahn, PLLC

(57) ABSTRACT

A portion 12a of a side duct 12 which is closer to a quarter glass 61 is formed into a convex cross-sectional portion protruding outwardly of the duct 12, and a rear garnish 63 is wrapped around the convex cross-sectional portion, whereby an end portion 63b of the rear garnish 63 which is closer to a quarter glass 61 is made closer to a rear pillar 62.

5 Claims, 14 Drawing Sheets

AUTOMOTIVE AIR DUCT AND GARNISH STRUCTURE

BACKGROUND OF THE INVENTION

1. Field of the Invention

The present invention relates to an automotive air duct and garnish structure which is preferable in obtaining a wider field of view.

2. Description of the Related Art

There exist vehicles in which an air duct is disposed on a passenger compartment side of a pillar and in which the air duct is wrapped around with a garnish. The air duct and garnish structure will be described below with reference to FIG. 14.

FIG. 14 is a cross-sectional view showing a related automotive air duct and garnish structure. A pillar 102 is constituted by an outer panel 100 and an inner panel 101, and a window glass 103 is mounted along a side of the pillar 102. An air duct 104 is disposed on passenger compartment sides of the pillar 102 and an edge portion of the window glass 103, and further, a garnish 105 is mounted on a passenger compartment side of the air duct 104 so that the air duct 104 is wrapped around with the garnish 105. Then, a range on an interior side of the window glass 103 is painted black from an edge portion 105b of the garnish 105 to the side of the pillar 102 so as to form a painted-black opaque portion 106.

As with the related art air duct and garnish structure in which the pillar 102 is thick, in a case where the air duct 104 is disposed only on the passenger compartment side of the pillar 102, the air duct 104 largely protrudes into the passenger compartment, whereby the space in the passenger compartment is reduced.

Since the cross-sectional area of the air duct 104 cannot be modified with a view to securing a predetermined amount of air ventilation, in order to avoid a risk that the space inside the passenger compartment is reduced as described above, the protruding amount of the air duct 104 into the passenger compartment is reduced by disposing the air duct 104 on a passenger compartment side of a boundary between the pillar 102 and the window glass 103 which is disposed adjacent to the pillar 102.

However, since the air duct 104 extends over a side of the window glass 103, the garnish 105 covers a part of the window glass 103, this deteriorating the field of view.

SUMMARY OF THE INVENTION

The invention was made to cope with the above problem, and an object thereof is to provide an automotive air duct and garnish structure which can provide a wider field of view in the event that an air duct is disposed at a pillar portion.

With a view to attaining the above object, according to the invention, there is provided an automotive air duct and garnish structure for an automotive vehicle wherein an air duct is vertically disposed inside a passenger compartment at a boundary between a pillar and a window glass and wherein said air duct is wrapped around with a garnish. A portion of the air duct which is closer to the window glass is formed to constitute a convex cross-sectional portion protruding outwardly of the air duct, and that the garnish is wrapped around the convex cross-sectional portion, whereby an end portion of the garnish which is closer to the window glass is positioned closer to the pillar.

The portion of the air duct which is closer to the window glass is formed to constitute the convex cross-sectional portion protruding outwardly of the air duct, and the garnish is wrapped around the convex cross-sectional portion, whereby the end portion of the garnish which is closer to the window glass is positioned closer to the pillar.

As a result of this, the portion of the window glass which is covered with the end portion of the garnish which is closer to the window glass is reduced, and in addition, since the convex cross-sectional portion is provided on the air duct, it is possible to obtain a wider field of view without reducing the cross-sectional area of the air duct.

DETAILED DESCRIPTION OF THE PREFERRED EMBODIMENTS

Figure 1:
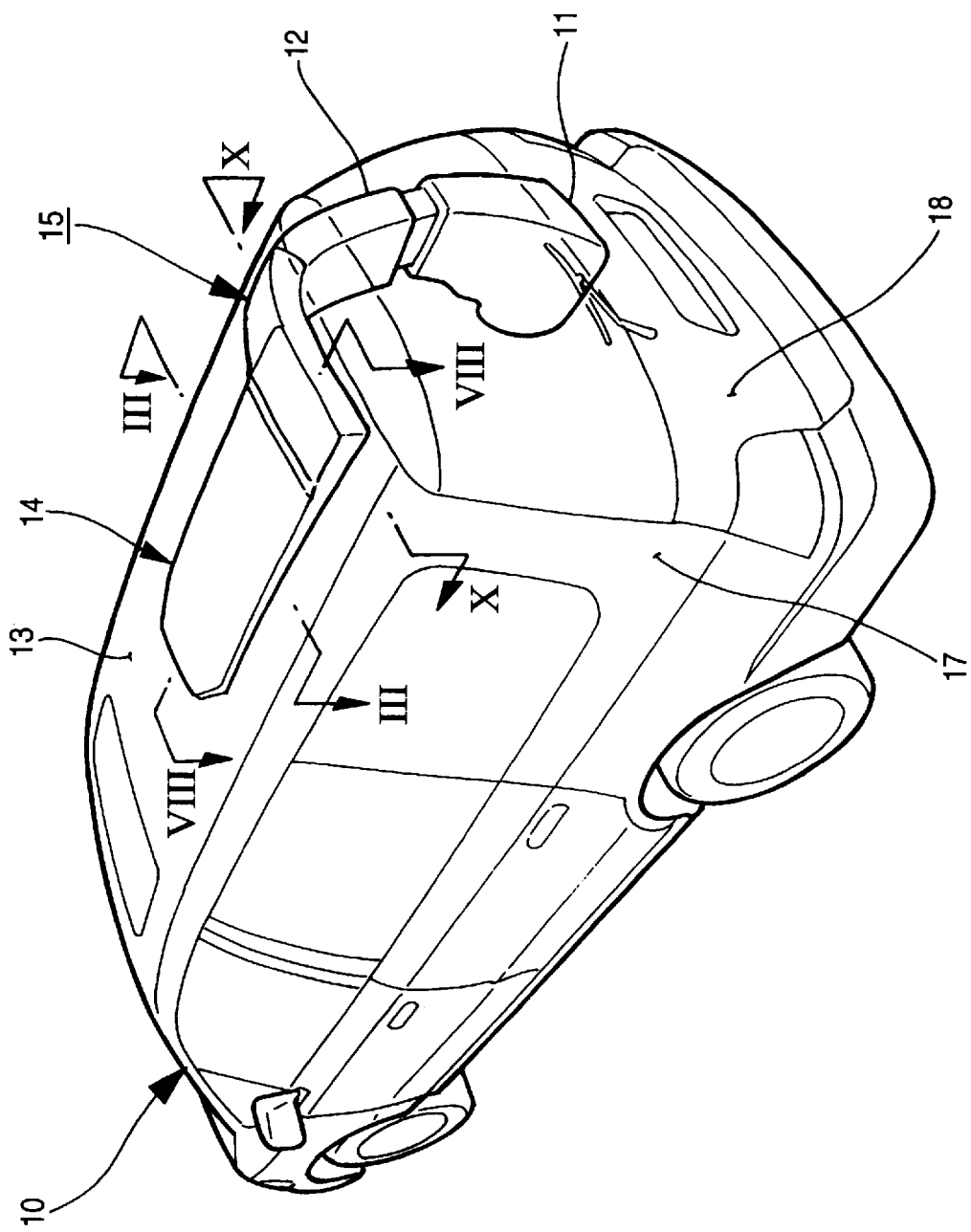
FIG. 1 is a perspective view of a vehicle adopting an air duct and garnish structure according to the invention.

Referring to the accompanying drawings, a mode for carrying out the invention will be described below. Note that the drawings are to be seen in a direction designated by the orientation of reference numerals.

FIG. 1 is a perspective view of a vehicle which adopts an air duct and garnish structure according to the invention, in which an air conditioner 15 for rear seats is shown in which an air conditioning unit 11 comprising a heater unit, a cooler unit and a blower motor is disposed inside a right rear side panel (not shown) of a vehicle 10, and in which a roof duct 14 disposed underneath a roof panel 13 is connected to the air conditioning unit 11 via a side duct 12 which is an air duct. Note that reference numeral 17 denotes a left rear side panel and reference numeral 18 denotes a back door.

Figure 2:
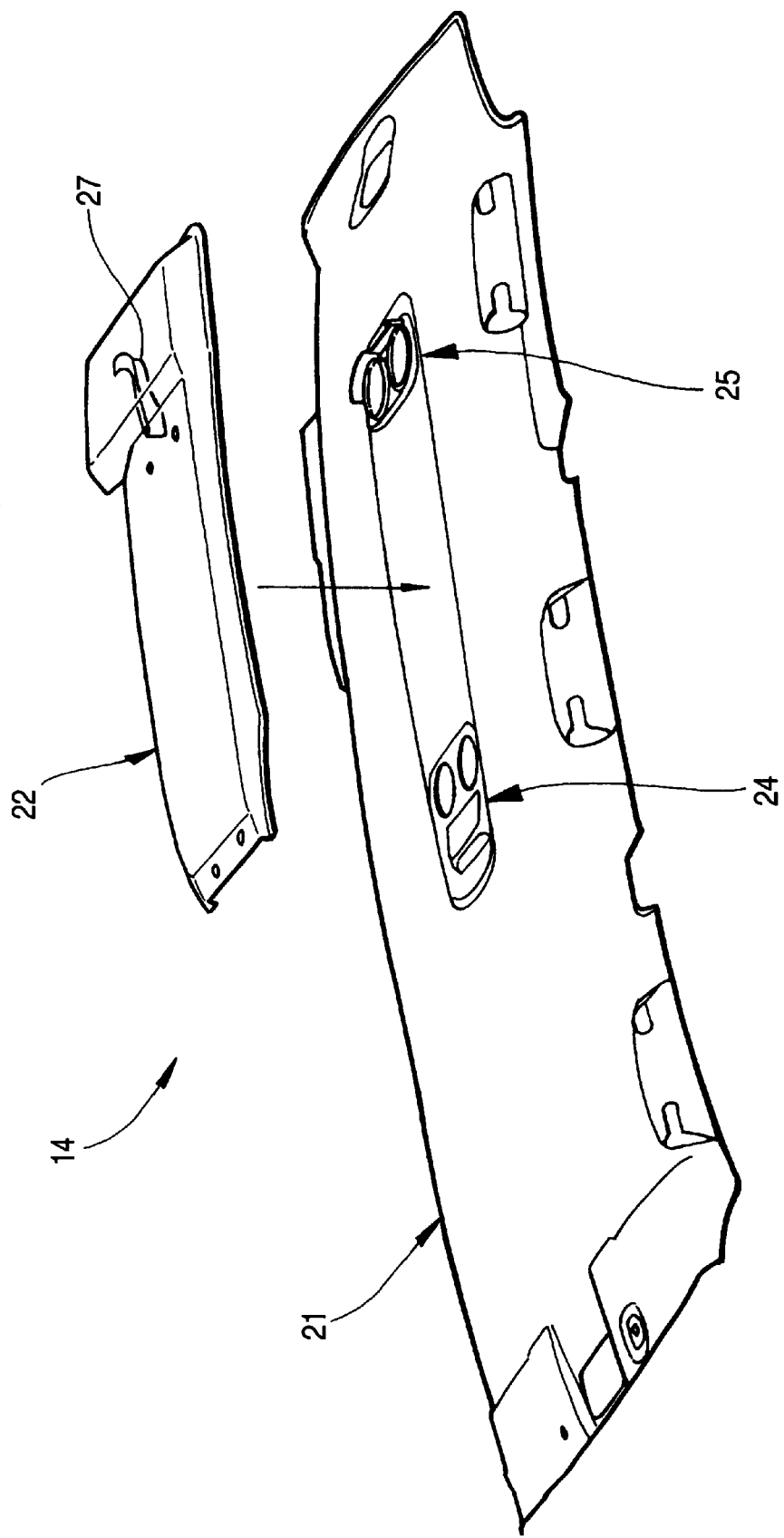
FIG. 2 is an exploded perspective view of a roof duct according to the invention.

FIG. 2 is an exploded perspective view of the automotive roof duct according to the invention, and the roof duct 14 is constituted by a roof lining 21 attached to an inside of the roof panel 13 (refer to FIG. 1) and a resin duct panel 22 attached to an upper surface of the roof lining 21.

The roof lining 21 is provided at a transversely central portion of a vehicle with a front air outlet portion 24 and a rear air outlet portion 25 from which conditioned air whose temperature and volume are adjusted by the air conditioning unit 11 is discharged toward rear seats; a second-row seat and a third-row seat, respectively.

Figure 3:
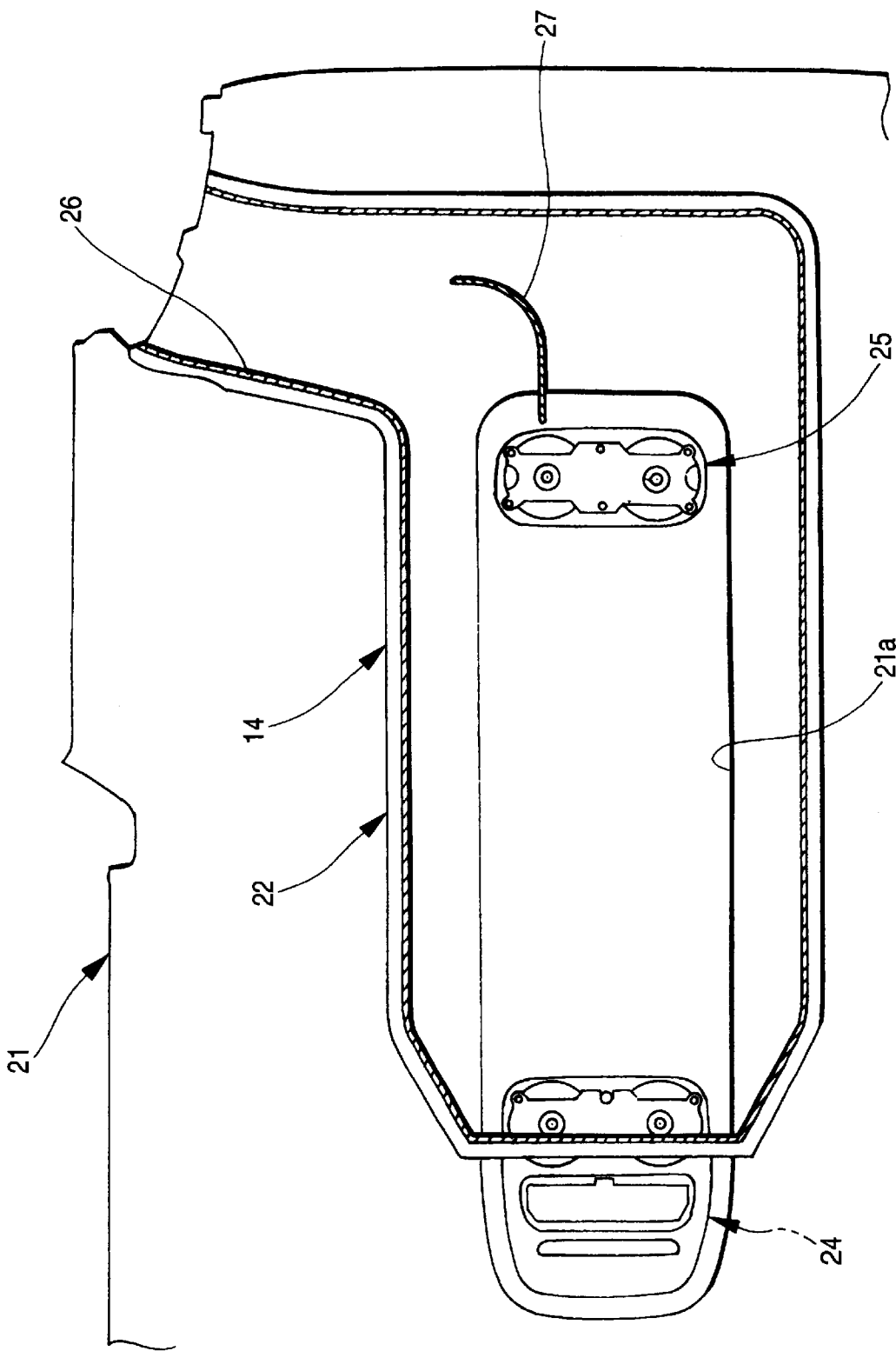
FIG. 3 is a sectional view taken along the line III—III of FIG. 1.

FIG. 3 is a horizontally sectional view of the duct panel 22 taken along the line III—III of FIG. 1.

The duct panel 22 is formed into an L-shape when viewed from the top, and the roof duct 14 is formed into something like a rectangular air reservoir chamber, when viewed from the top, by the duct panel 22 and the roof lining 21 and extends longitudinally from a rear portion to a substantially central portion of a ceiling at the transversely central portion of the vehicle. An air introduction portion 26 is provided at a rear side portion of the air reservoir chamber for connection to the side duct 12 (refer to FIG. 1), and an air distribution panel 27 is provided in the interior of the air reservoir chamber or on an inner surface of the duct panel 22 for distributing conditioned air to a lower surface of the air reservoir chamber or to the front air outlet portion 24 and the rear air outlet portion 25 provided in the roof lining 21. Note that reference numeral 21a denotes a depressed portion formed in the roof lining 21.

Figure 4:
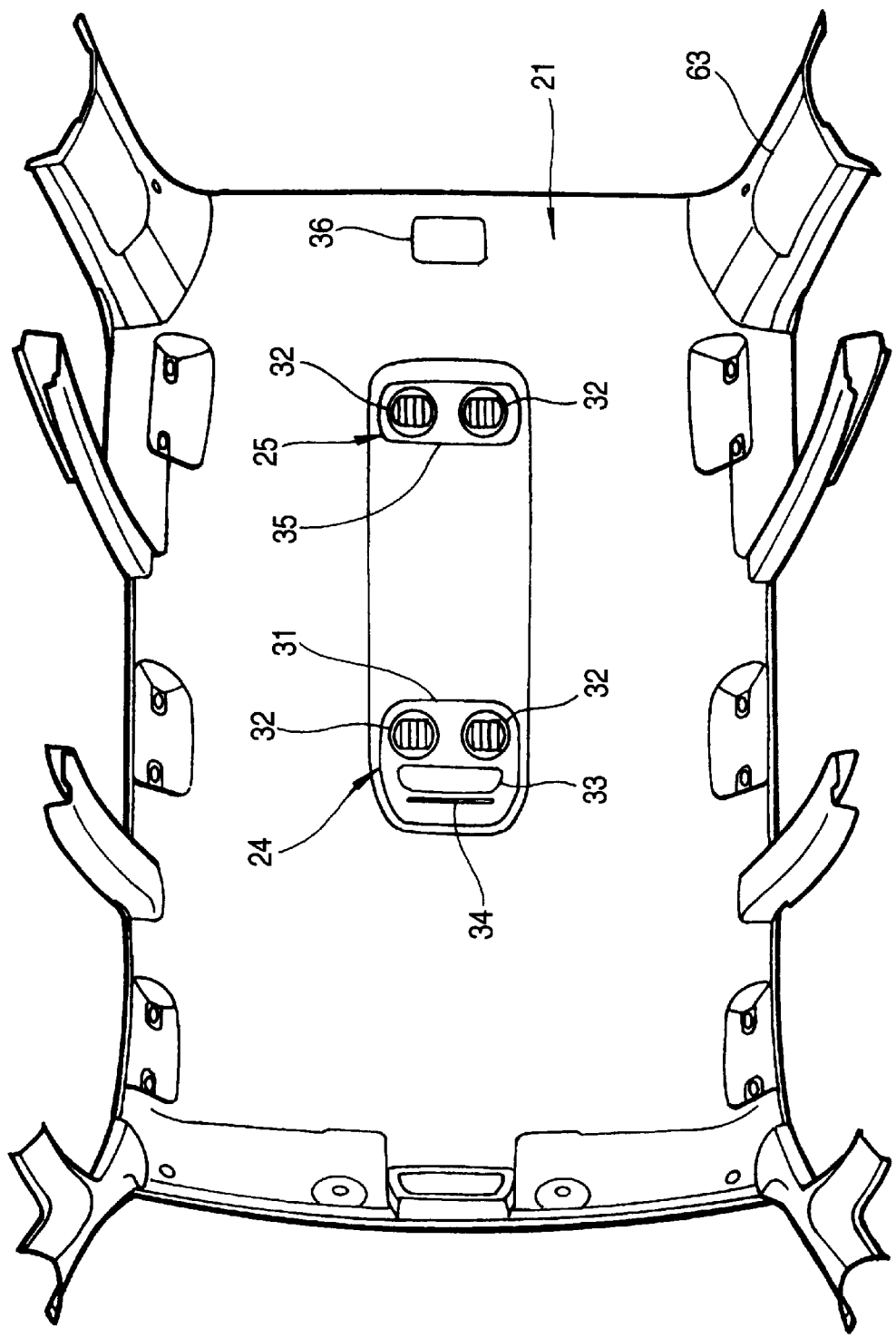
FIG. 4 is a bottom plan view of an automotive ceiling of according to the invention.

FIG. 4 is a bottom plan view of the ceiling according to the invention. In the front air outlet portion 24 attached to the roof lining 21, attached to a base member 31 are conditioned air direction adjusting mechanisms 32, 32 for adjusting the direction in which conditioned air is discharged, a center room lamp 33 and an air conditioning control portion 34 for controlling the adjustment of the temperature and volume of conditioned air.

Additionally, in the rear air outlet portion 25, conditioned air direction adjusting mechanisms 32, 32 are attached to a base member 35. Note that reference numeral 36 is a rear room lamp.

Figure 5:
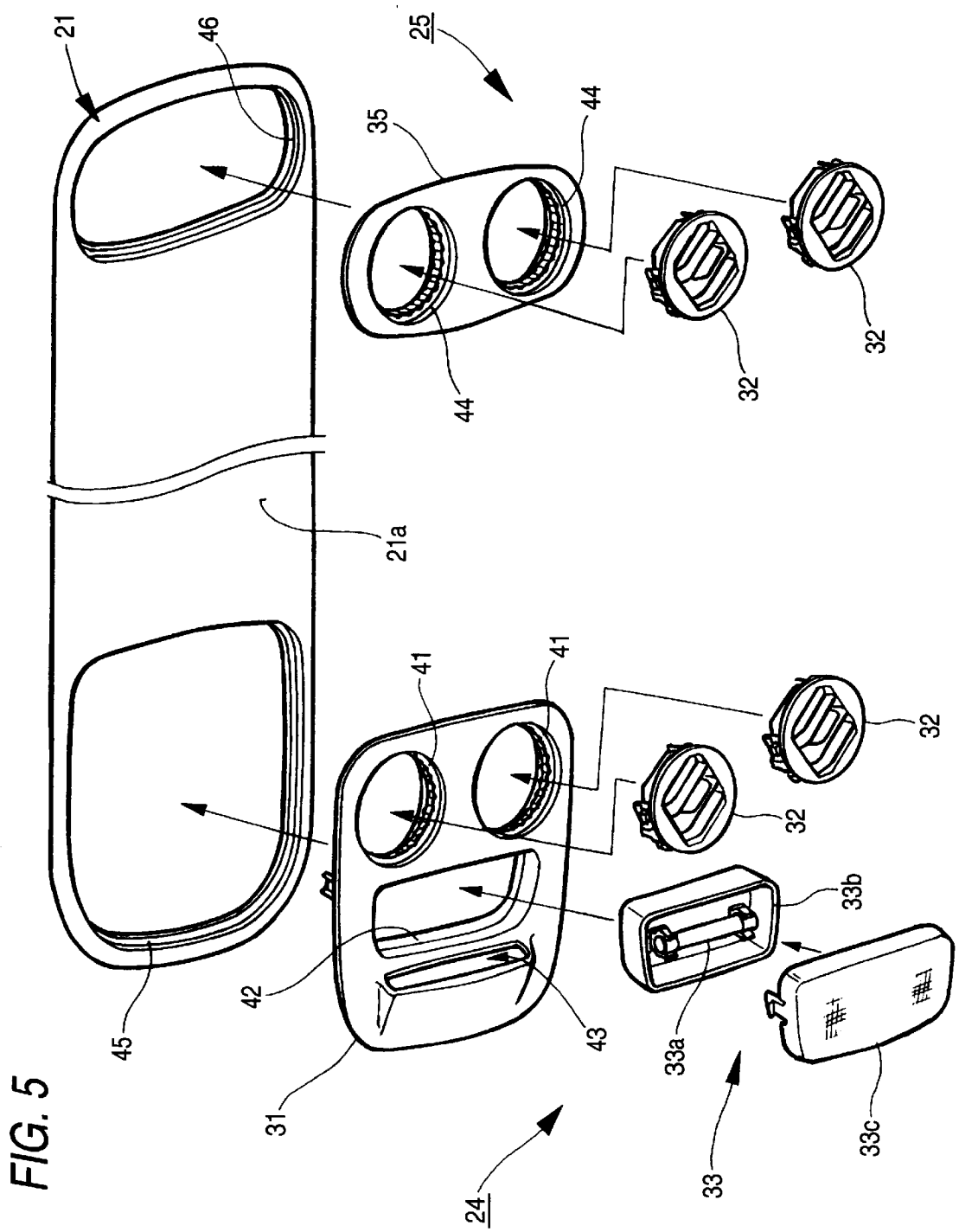
FIG. 5 is an exploded perspective view of front and rear air outlet portions of an automotive air conditioner according to the invention.

FIG. 5 is an exploded perspective view of the front and rear air outlet portions of the automotive air conditioner according to the invention showing a state in which provided in the base member 31 are conditioned air direction adjusting mechanism mounting holes 41, 41 for mounting therein the conditioned air direction adjusting mechanisms 32, 32, a lamp mounting hole 42 for mounting therein the center room lamp 33 and an air conditioning control portion mounting portion 43 for mounting therein the air conditioning control portion 34 (not shown, refer to FIG. 4), in which conditioned air direction adjusting mechanism mounting holes for mounting therein the conditioned air direction adjusting mechanisms 32, 32 are provided in the base member 35 of the rear air outlet portion 25, and in which formed in the depressed portion 21a in the roof lining 21 are a front air outlet portion mounting hole 45 for mounting therein the front air outlet portion 24 and a rear air outlet portion mounting hole 46 for mounting therein the rear air outlet portion 25.

Figure 6:
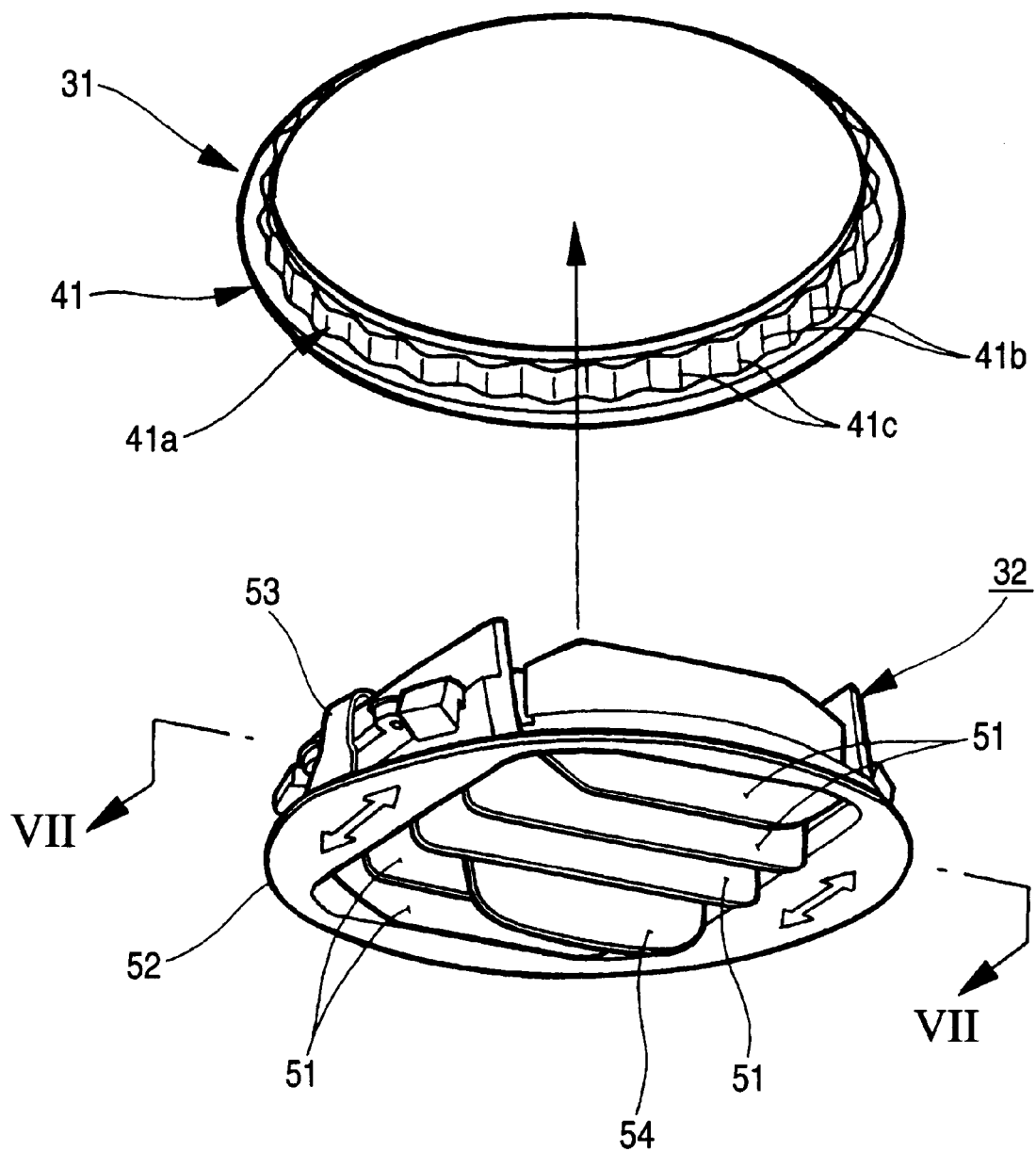
FIG. 6 is an exploded perspective view of conditioned air direction adjusting mechanisms and mounting holes therefor of the automotive air conditioner according to the invention.

FIG. 6 is an exploded perspective view of the conditioned air direction adjusting mechanism of the automotive air conditioner according to the invention and the mounting hole for mounting therein the same mechanism.

The conditioned air direction adjusting mechanism 32 comprises a plurality of fins 51 . . . (hereinafter, . . . denotes plurality) and a fin holding portion 52 for holding these fins 51 . . . in such a manner as to allow them to freely swing.

Note that reference numeral 53 denotes a plate spring attached to an outer circumferential portion of the fin holding portion 52.

A tab portion 54 is provided on one of the fins 51 so that the respective fins 51 are allowed to fall down simultaneously by falling down the tab portion 54.

The conditioned air direction adjusting mechanism mounting hole 41 has irregularities formed on an inner circumferential portion thereof, and reference numeral 41b. . . denotes a crest portion and reference numeral 41c . . . denotes a root portion.

The aforesaid inner circumferential portion 41a is formed into a serrated portion comprising a plurality of crest portions 41b and a plurality of root portions 41c.

The conditioned air direction adjusting mechanism mounting hole 44 (refer to FIG. 5) has a shape identical to that of the conditioned air direction adjusting mechanism mounting hole 41.

Figure 7:
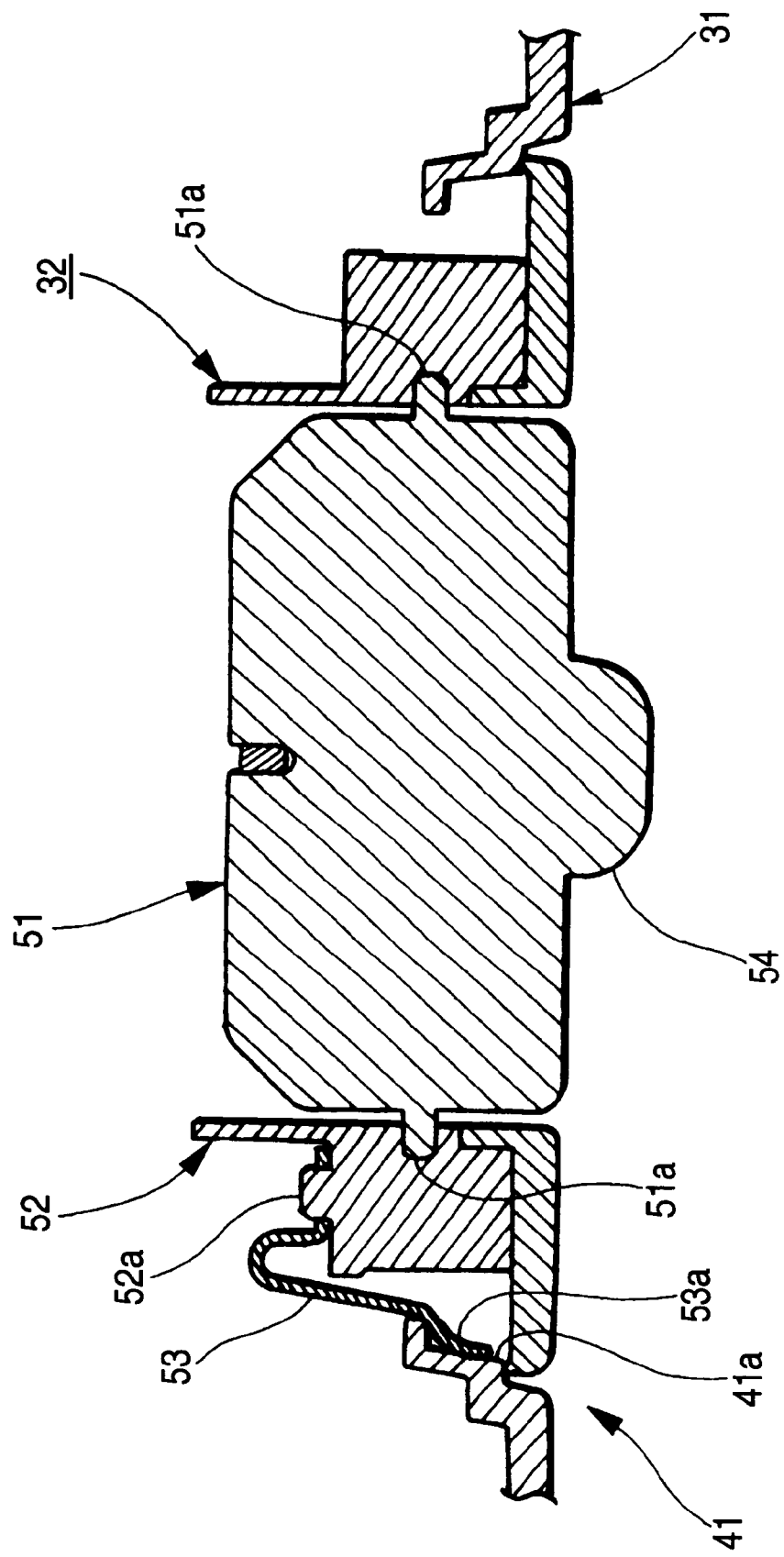
FIG. 7 is a sectional view taken along the line VII—VII of FIG. 6.

FIG. 7 is a sectional view taken along the line VII–VII of FIG. 6 showing a state in which projections 51a, 51a are provided on side portions of the fin 51, in which the fin 51 is mounted in the fin holding portion 52 at the projections 51a, 51a in such a manner as to freely swing thereat, in which a projecting portion 52a is provided on an upper portion of the fin holding portion 52, and in which the plate spring 53 is fitted in the projecting portion 52a for mounting thereat, while a distal end 53a of the plate spring 53 is brought into abutment with the inner circumferential portion 41a of the conditioned air direction adjusting mechanism mounting hole 41.

As has been described above with reference to FIGS. 6, 7, not only is the conditioned air direction adjusting mechanism 32 allowed to rotate relative to the conditioned air direction adjusting mechanism mounting hole 41 but also the conditioned air direction adjusting mechanism 32 is prevented from being caused to rotate by vibrations or the like through the abutment of the distal end portion 53a of the plate spring 53 against the irregular inner circumferential portion 41a of the conditioned air direction adjusting mechanism mounting hole 41.

Figure 8:
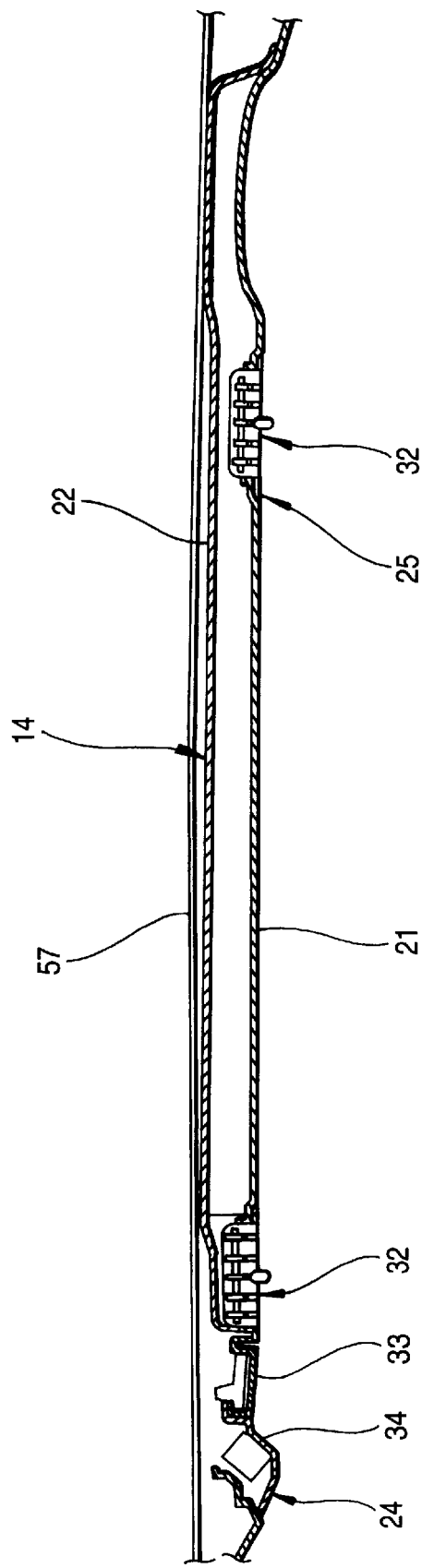
FIG. 8 is a sectional view taken along the line VIII—VIII of FIG. 1.

FIG. 8 is a longitudinal sectional view taken along the line VIII—VIII of FIG. 1 showing a state in which the roof duct 14 is formed flat and longitudinal in the longitudinal direction of the vehicle between a roof panel 57 and the roof lining 21.

Thus, the roof lining 21 can be disposed at a higher position by forming the roof duct 14 flat, whereby the space within the passenger compartment can be increased while suppressing the increase in height of the vehicle.

Figure 9:
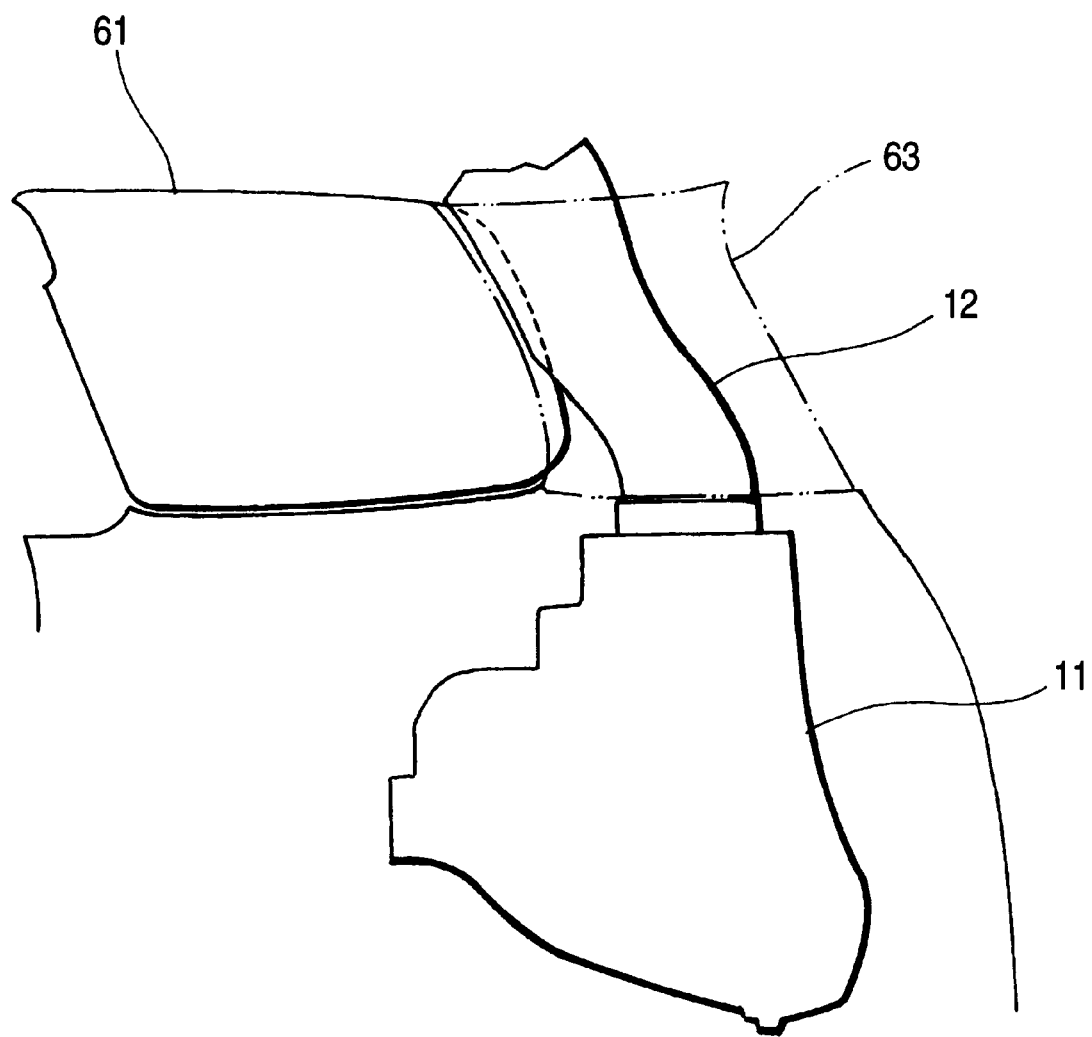
FIG. 9 is a side view showing an air conditioning unit and a side duct of the automotive air conditioner according to the invention.

FIG. 9 is a side view showing the air conditioning unit 11 and the side duct 12 of the automotive air conditioner according to the invention. The side view shows a sate in which the side duct 12 connecting to the air conditioning unit 11 is disposed on passenger compartment sides of a rear portion of a quarter glass 61 which is a window glass and a rear pillar (which will be described later) positioned rearward of the quarter glass 61 and in which the side duct 12 together with the rear pillar is covered with a rear garnish 63.

Figure 10:
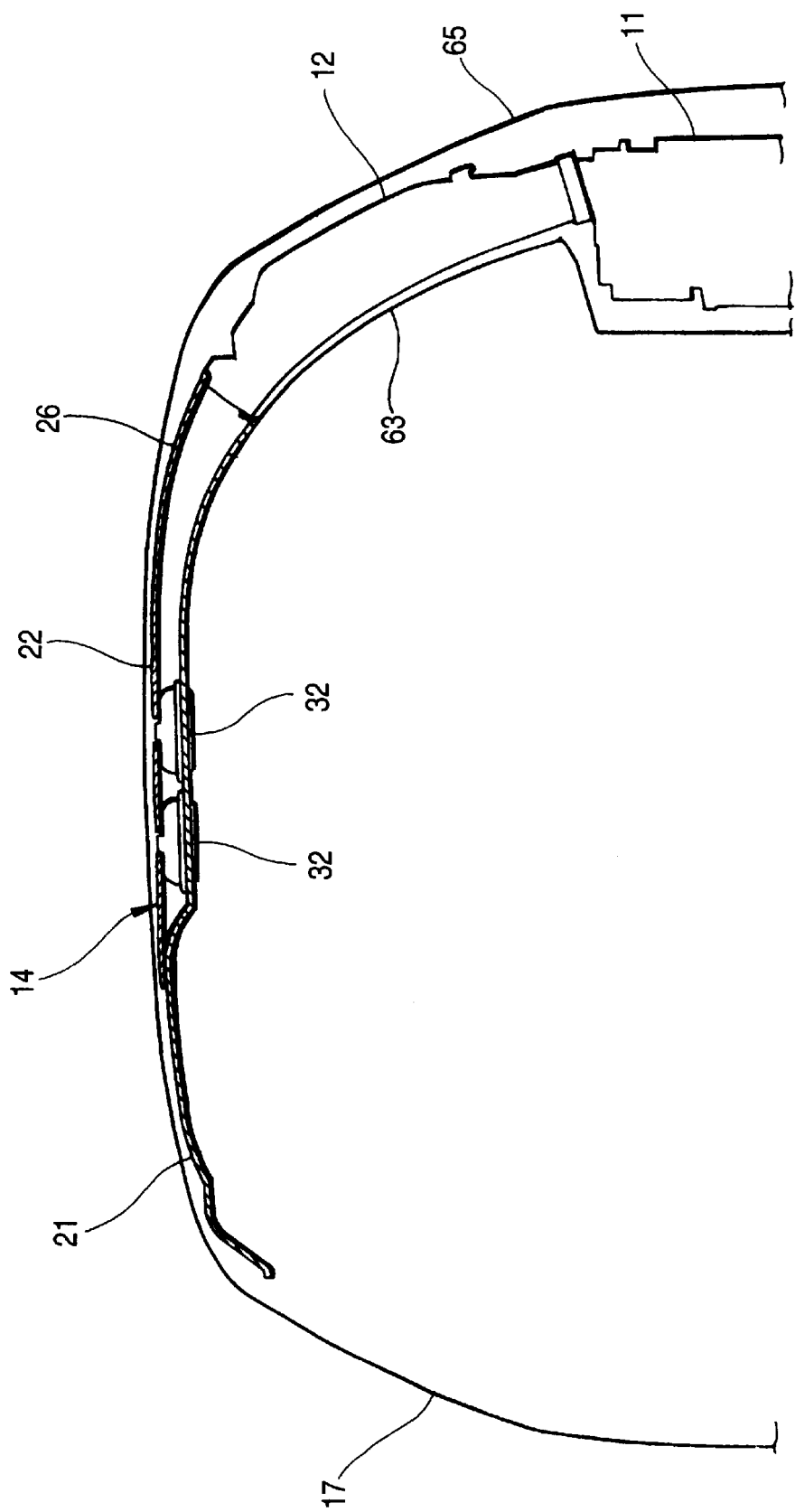
FIG. 10 is a sectional view taken along the line X—X of FIG. 1.

FIG. 10 is a sectional view taken along the line X—X showing a state in which the air introducing portion 26 of the roof duct 14 is connected to the air conditioning unit 11 via the side duct 12.

Figure 11:
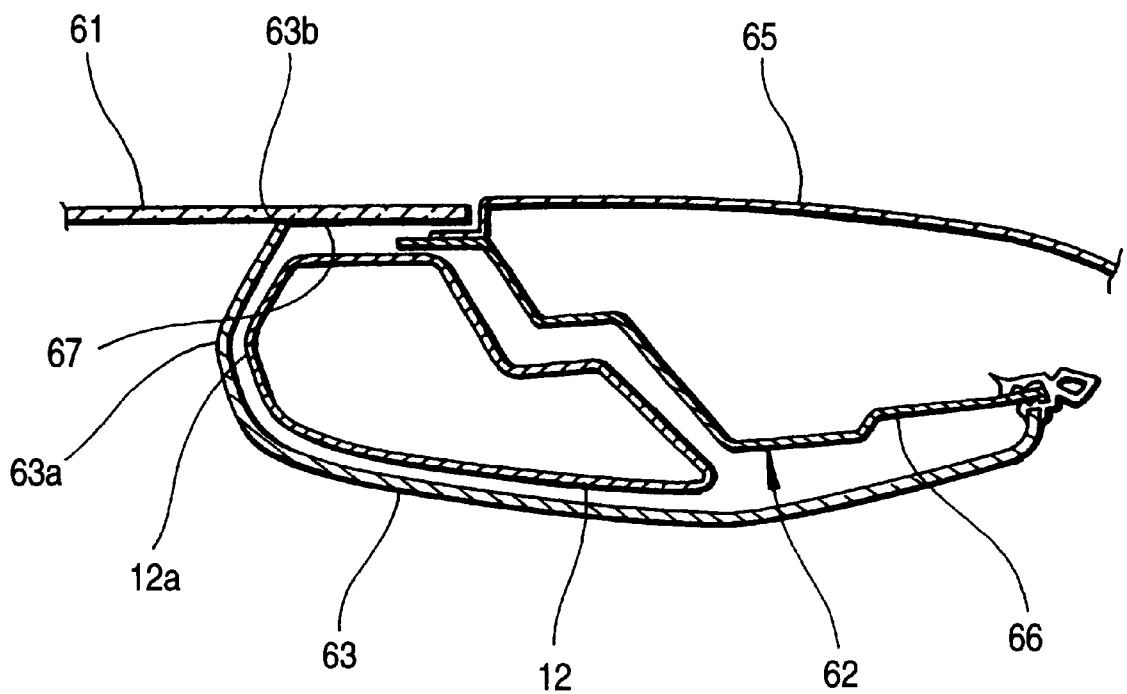
FIG. 11 is a cross-sectional view of a side duct according to the invention.

FIG. 11 is a cross-sectional view of the side duct according to the invention showing a state in which the side duct 12 is vertically disposed on a passenger compartment side of a boundary between the quarter glass 61 and the rear pillar 62 as a pillar, and in which the side duct 12 is covered with the rear garnish 63 as a garnish. Note that reference numerals 65, 66 denote a right rear side panel and an inner panel which both constitute the rear pillar 62 and that reference numeral 67 denotes a painted-black portion which is made opaque by painting black an interior surface of the quarter glass 61.

The side duct 12 is a member in which a portion 12a thereof which is closer to the quarter glass 61 is formed to constitute a convex cross-sectional portion protruding outwardly of the air duct and to have a cross-sectional area of S.

The rear garnish 63 is a member which is wrapped around the convex cross-sectional portion (i.e., the port ion 12a) of the side duct 12 at a front portion 63a and is made closer to the rear pillar 62 at an end portion 63b thereof which is closer to the quarter glass 61.

Next, an air flow in the air conditioner 15 as described heretofore will be described.

Figure 12:
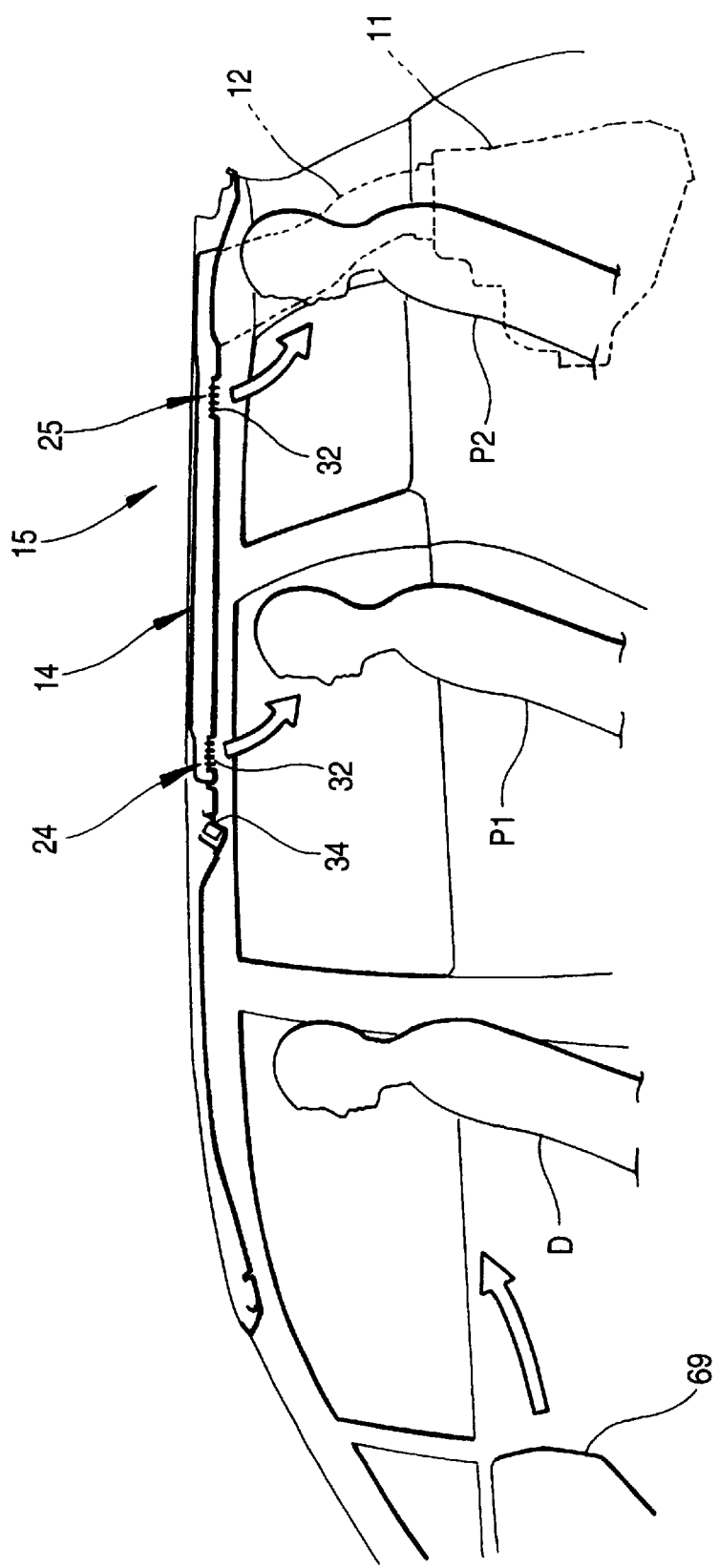
FIG. 12 is an operational view explaining the air flow of the automotive air conditioner according to the invention.

FIG. 12 is an operational view describing the air flow in the automotive air conditioner according to the invention.

A passenger P1 seated on the rear second-row seat operates the air conditioning control portion 34 provided on the ceiling to activate the blower motor inside the air conditioning unit 11.

This triggers the supply of conditioned air from the air conditioning unit 11 to the roof duct 14 via the side duct 12.

Then, a part of the conditioned air is discharged from the front air outlet portion 24 in the roof duct 14 toward the passenger P1 on the second-row seat as indicated by an arrow, and additionally, another part of the conditioned air is discharged from the rear air outlet portion 25 toward a passenger P2 on the third-row seat.

The respective passengers P1, P2 can adjust the direction of the discharged conditioned air as desired with the conditioned air direction adjusting mechanisms 32.

Additionally, the driver D on the driver's seat and a passenger D on the front seat can also adjust the direction of discharged conditioned air with conditioned air direction adjusting mechanisms which are not shown provided in an instrument panel 69.

Next, an operation of the side duct 12 and rear garnish 63 construction described heretofore will be described below.

Figure 13:
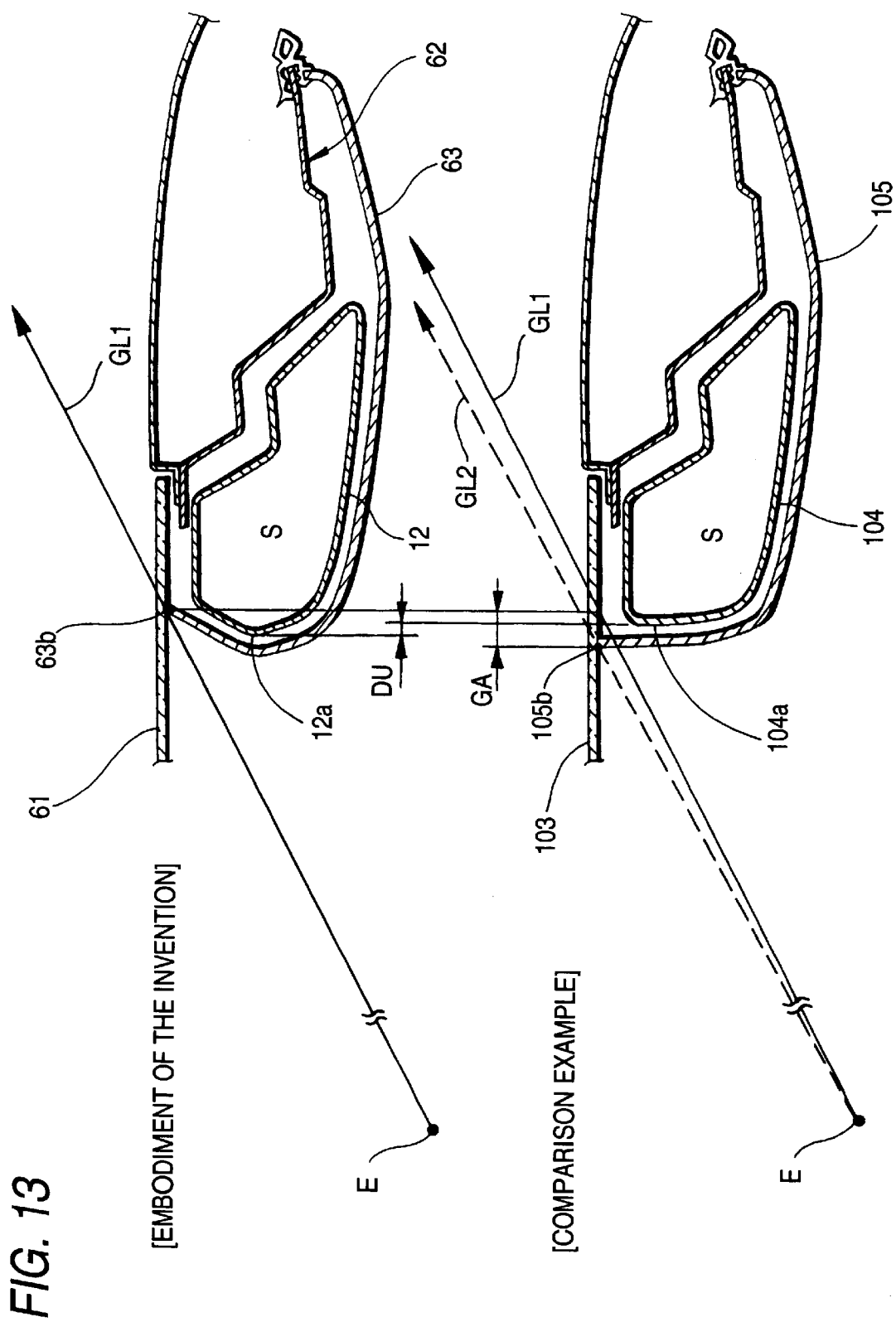
FIG. 13 is an operational view explaining an operation of the side duct and rear garnish structure according to the invention.
Figure 14:
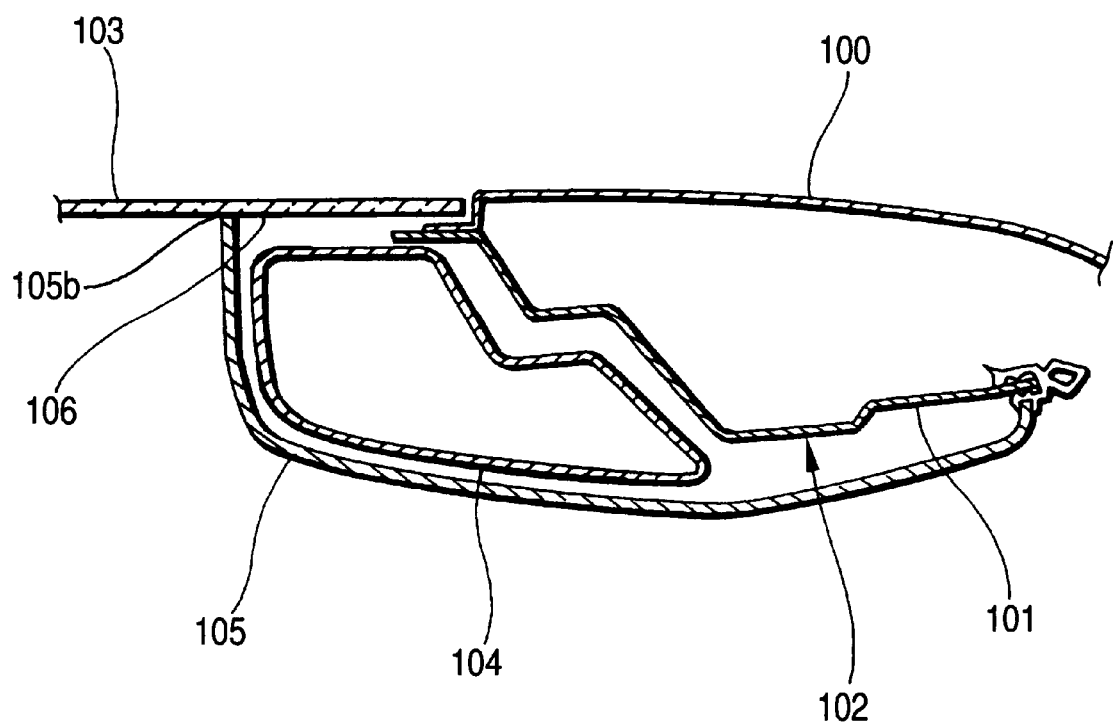
FIG. 14 is a cross-sectional view showing the construction of a related automotive air duct and garnish structure.

FIG. 13 is an operational view explaining an operation of the side duct and rear garnish structure according to the invention, and an explanation will be made while comparing the embodiment according to the invention with a comparison example (which is the related art construction shown in FIG. 14).

In the embodiment of the invention, for example, assume that a point E is the position of the eyes of the passenger D such as the driver (refer to FIG. 12), and that GL1 is a direction in which the passenger D gazes at a rear-most end portion of the quarter glass 61 through which the passenger D can look at the outside of the vehicle (i.e., a portion corresponding to the end portion 63b of the rear garnish 63 and designated by a point).

In the comparison example, assume that reference numeral 104a is a portion of an air duct 104 which is closer to a window glass 103 and that reference numeral 105b is an end portion of a garnish 105 which is closer to the window glass 103.

In the embodiment of the invention, the passenger's field of view rearward of the vehicle is expanded.

Namely, the end portion 63b of the rear garnish 63 is moved closer to the rear of the vehicle (the rear pillar 62) by a distance GA relative to an end portion 105b of the garnish 105 of the comparison example.

In this case, in order to secure the cross-sectional area S of the air duct 104 of the comparison example even with the rear duct 12 of the embodiment of the invention (that is, the cross-sectional area of the rear duct 12 of the embodiment of the invention is equal to the cross-sectional area S of the air duct 104 of the comparison example), the portion 12a of the rear duct 12 which is closer to the quarter glass 61 is caused to protrude forward further by a distance DU than the portion 104a of the air duct 104 which is closer to the window glass 103 to thereby be formed into the convex cross-sectional portion.

Assuming that in the comparison example, GL2 is a direction in which the passenger D gazes at a rear-most end portion of the window glass 103 through-which he or she can look at the outside of the vehicle (i.e. corresponding to the end portion 105b of the garnish 105), in the embodiment of the invention, the gazing line GL1 is oriented more rearward than the gazing line GL2, whereby the embodiment of the invention can provide a wider field of rear view than the comparison example.

As is explained above, according to the invention, there is provided an automotive air duct and garnish structure for an automotive vehicle 10 (refer to FIG. 1) wherein the side duct 12 is vertically disposed inside the passenger compartment at a boundary between the rear pillar 62 and the quarter glass 61 and wherein the side duct 12 is wrapped around with the rear garnish 63. The portion 12a of the side duct 12 which is closer to the quarter glass 61 is formed to constitute the convex cross-sectional portion protruding outwardly of the air duct 12, and that the rear garnish 63 is wrapped around the convex cross-sectional portion, whereby the end portion 63a of the rear garnish 63 which is closer to the quarter glass 61 is positioned closer to the rear pillar 62.

According to the above construction, since the portion of the quarter glass 61 covered by the end portion 63b of the rear garnish 63 which is closer to the quarter glass 61 is reduced, and in addition, since the convex cross-sectional portion is provided at the front portion of the side duct 12, a wider field of view can be obtained without reducing the cross-sectional area of the side duct 12.

Note that in FIG. 11, while the convex cross-sectional portion is provided at the portion 12a of the side duct 12 which is closer to the quarter glass 61 and the rear garnish 63 is formed so as to wrap around the convex cross-sectional portion of the side duct 12, the shape of the portion 12a of the side duct 12 which is closer to the quarter glass 61 is not limited to the shape shown in the figures but may be formed into, for example, a circular convex cross-section which becomes convex toward the front of the vehicle, and the front portion of the rear garnish 63 may also be formed into a circular shape, like the side duct 12, which wraps around the convex circular cross-sectional portion protruding toward the front of the vehicle.

Being constructed as described above, the invention exhibits the following advantage.

With the automotive air duct and garnish structure according to the aspect of the invention, since the portion of the air duct which is closer to the window glass is formed to constitute the convex cross-sectional portion protruding outwardly of the air duct and the garnish is wrapped around the convex cross-sectional portion, whereby the end portion of the garnish which is closer to the window glass is positioned closer to the pillar, the portion of the window glass which is covered by the end portion of the garnish which is closer to the window glass is reduced, and moreover, since the convex cross-sectional portion is provided at the air duct, a wider field of view can be obtained without reducing the cross-sectional area of the air duct. Consequently, reversing the vehicle can be performed easily.

What is claimed is:

1. An automotive air duct and garnish structure, comprising:

an air duct vertically disposed inside a passenger compartment in the vicinity of a boundary between a pillar and a window glass, a portion of said air duct which is closer to said window glass being formed to have a convex cross-sectional portion projecting forwardly in a longitudinal direction of a vehicle; and a garnish wrapping around said air duct in conjunction with said pillar and said window glass, wherein said garnish is formed such as to be disposed along said convex cross-sectional portion, and an end portion of said garnish which is closer to said window glass is positioned closer to said pillar.

2. An automotive air duct and garnish structure according to claim 1, wherein said air duct is disposed in the vicinity of a boundary between a rear pillar and a quarter glass.

3. An automotive air duct and garnish structure according to claim 1, wherein said convex cross-sectional portion is an arc-shaped convex cross-sectional portion.

4. An automotive air duct and garnish structure according to claim 1, wherein said air duct is connected to an air introducing portion of a roof duct.

5. An automotive air duct and garnish structure according to claim 1, wherein said garnish includes a slant surface extending forwardly from the window-glass side end portion thereof.

* * * * *